(12) United States Patent
Brusewitz

(10) Patent No.: US 6,898,245 B2
(45) Date of Patent: May 24, 2005

(54) LOW COMPLEXITY VIDEO DECODING

(75) Inventor: Harald Brusewitz, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 701 days.

(21) Appl. No.: 09/818,043

(22) Filed: Mar. 26, 2001

(65) Prior Publication Data

US 2003/0021345 A1 Jan. 30, 2003

(51) Int. Cl.$^7$ .................................................. H04N 7/12
(52) U.S. Cl. ................... 375/240.18; 382/299; 348/445
(58) Field of Search ........................ 375/240.18, 240.16, 375/240.15, 240.03, 240.19, 240.12, 240.24; 382/232, 298, 299; 348/390.1, 404.1, 445, 458

(56) References Cited

U.S. PATENT DOCUMENTS

| | | | | |
|---|---|---|---|---|
| 5,134,478 A | | 7/1992 | Golin | ......................... 358/136 |
| 5,262,854 A | | 11/1993 | Ng | .............................. 358/133 |
| 5,504,849 A | | 4/1996 | Brusewitz | ................... 395/152 |
| 5,689,800 A | | 11/1997 | Downs | ........................ 455/5.1 |
| 5,812,144 A | | 9/1998 | Potu et al. | .................. 345/439 |
| 5,825,927 A | * | 10/1998 | Boyce et al. | ............... 382/232 |
| 5,973,745 A | | 10/1999 | Kondo | ........................ 348/421 |
| 6,057,889 A | | 5/2000 | Reitmeier et al. | .......... 348/555 |
| 6,148,033 A | * | 11/2000 | Pearlstein et al. | ..... 375/240.16 |
| 6,175,592 B1 | * | 1/2001 | Kim et al. | ............. 375/240.16 |
| 6,343,098 B1 | * | 1/2002 | Boyce | ................... 375/240.03 |
| 6,442,201 B2 | * | 8/2002 | Choi | ..................... 375/240.12 |
| 6,563,876 B2 | * | 5/2003 | Boyce et al. | .......... 375/240.15 |
| 6,668,018 B2 | * | 12/2003 | Pearlstein et al. | ..... 375/240.12 |
| 2004/0126021 A1 | * | 7/2004 | Sull et al. | .................... 382/233 |

FOREIGN PATENT DOCUMENTS

| | | | |
|---|---|---|---|
| EP | 0884912 A2 | 12/1998 | |
| EP | 0895425 A2 | 2/1999 | |

OTHER PUBLICATIONS

European Patent Office Standard Search Report, File No. RS 107121 US, Nov. 6, 2001, pp. 1–5.

\* cited by examiner

Primary Examiner—Gims Philippe

(57) ABSTRACT

Method and apparatus for decoding a compressed video signal having a first resolution for use by a display unit having a second resolution. The method and apparatus involve downscaling the compressed video bit stream before the bit stream is decoded, which results in a considerable decrease in decoding complexity requiring less memory and lower CPU power usage.

8 Claims, 3 Drawing Sheets

LOW COMPLEXITY VIDEO DECODING

BACKGROUND OF THE INVENTION

1. Technical Field of the Invention

The present invention relates generally to the field of signal processing, and, more particularly, to a method and apparatus for decoding a compressed video signal for use by another unit having a lower resolution, or alternatively, an equal or higher resolution than the compressed video signal.

2. Description of the Prior Art

Video image signals representative of video pictures are often processed at a first location (transmitter location) to encode the video image signals into a compressed video bit stream. The encoded bit stream may then be transmitted from the first location to a second location (receiver location) where the received bit stream is decoded for displaying the video pictures, processing, or storing the pixel values for later retrieval at the receiver location. The receiver location may, for example, process the decoded bit stream to code with a new compression format, or display the video pictures on a monitor or other display unit.

Video image signals may be displayed using a variety of video formats, such as common intermediate format (CIF) and quarter common intermediate format (QCIF). CIF specifies a data rate of 30 frames per second (fps), with each frame containing 288 lines and 352 pixels per line (352*288). QCIF, a related standard, also specifies a data rate of 30 fps, however, each frame contains only 144 lines and 176 pixels per line (176*144). QCIF is therefore one-fourth the resolution of CIF. Several other formats exist, e.g. PGA and MPEG, which provide a multiplicity of resolutions available for displaying, storing, processing, etc. a video signal.

It sometimes occurs that the unit for storing, processing or displaying at the receiver location has a different resolution than that of the compressed video signal to which the bit stream corresponds. For example, the bit stream may correspond to a CIF picture resolution, whereas the unit for displaying, storing, or processing at the receiver location might use a QCIF resolution. This resolution difference necessitates that a downscaling procedure be carried out at the receiver location to permit the display unit to properly display the lower resolution picture.

FIG. 2 schematically illustrates a video decoding procedure that is known in the prior art and that may be carried out in receiver processing circuitry. Basically, the procedure includes first decoding the compressed video bit stream corresponding to, for example, CIF resolution, and then downscaling the decoded signal in order to, for example, display the image on a monitor that uses a different resolution than the compressed video bit stream. More particularly, the compressed video bit stream 121 is decoded by first passing the signal through an inverse discrete cosine transform (IDCT) 126. Then the prediction block 128 provides motion compensation by applying the motion vectors to the previous compressed video bit stream to form a reconstructed image. After decoding, the image is downscaled to produce the lower resolution image. The image is passed through a low-pass filter (not specifically shown), followed by a sub-sampling block 124 which sub-samples the image to produce the lower resolution picture which can be stored, processed, or displayed.

In the system illustrated in FIG. 2 the signal received by the receiver apparatus is first decoded with full resolution. A downscaling process is then performed so that the picture will fit into the low resolution display of the display unit. Decoding with full resolution and then downscaling is a complex process which is quite demanding of both memory and CPU capacity in the receiver apparatus.

SUMMARY OF THE INVENTION

The present invention provides an improved method and apparatus for processing a compressed video bit stream which corresponds to a first picture resolution so that the picture may be properly displayed, stored, or processed by a unit having a second resolution.

More particularly, when the second resolution is lower than the first resolution, the present invention includes the steps of downscaling the compressed video bit stream, and thereafter decoding the downscaled compressed video bit stream to provide the video signal having the second resolution.

The present invention also provides a method for displaying a video signal on a display unit with an equal or higher resolution than that of the compressed video signal. In this case, the video signal is displayed on a portion of the display unit.

In accordance with the present invention, downscaling of the compressed video bit stream is carried out before the bit stream is decoded. This considerably decreases decoding complexity, and requires less memory and lower CPU power usage than in the prior art.

According to the presently preferred embodiment of the invention, the downscaling step comprises removing high frequency discrete cosine transform (DCT) components of the bit stream. The subsequent decoding step utilizes a novel decoding algorithm having a modified Inverse DCT and a modified prediction block. The decoding algorithm requires less memory and fewer calculations than prior art techniques, and produces a picture quality which is almost imperceptible from the prior art method.

Further advantages and specific details of the invention will become apparent hereinafter in conjunction with the following detailed description of presently preferred embodiments.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PREFERRED EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
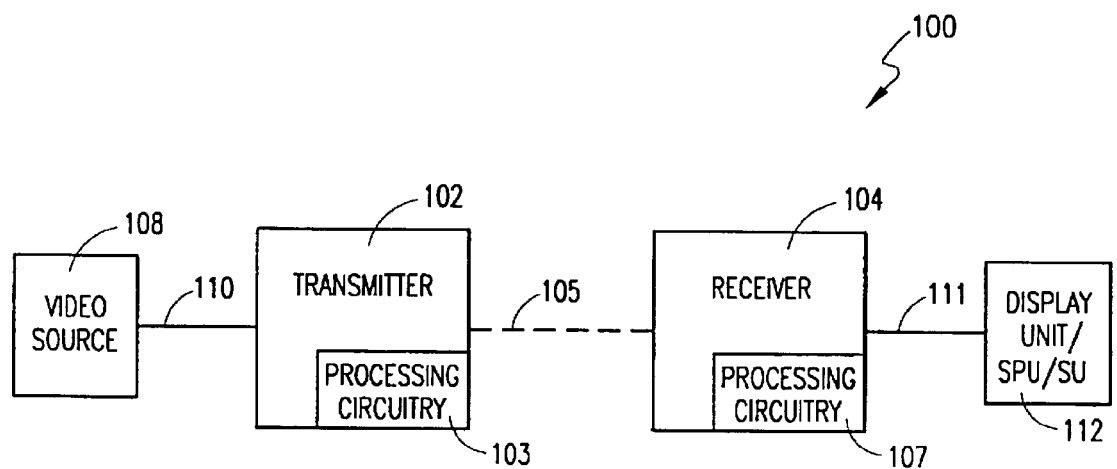
FIG. 1 schematically illustrates an overall system for processing video image data to assist in explaining the invention.
Figure 2:
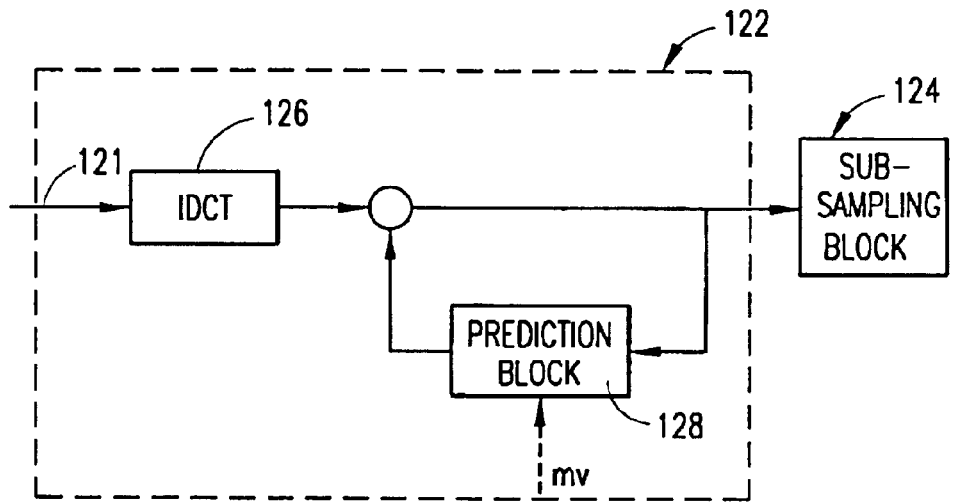
FIG. 2 schematically illustrates a known decoding procedure for downscaling a video image signal.

FIG. 1 schematically illustrates an overall system for processing video image data to illustrate an environment within which the video decoding method and apparatus of the present invention may be utilized. The system is generally designated by reference number 100 and includes a transmitter apparatus 102 and a receiver apparatus 104. The transmitter apparatus 102 is at a transmitter location and is adapted to receive an analog or digital video image signal 110 from a video source 108. Video source 108 may be any video source such as a video camera, a VCR, a DVD player, or any similar apparatus that generates analog or digital video image signals. The video source 108 may also be a video cable, an antenna, or any other device that receives analog or digital video image signals from a remote source.

Transmitter apparatus 102 includes suitable processing circuitry 103 which converts the video image signal 110 to a compressed video bit stream which corresponds to the video image signal 110 utilizing encoding techniques which are well-known to those skilled in the art, and thus need not be described herein. The transmitter apparatus 102 next transmits the compressed video bit stream to the receiver apparatus 104 via any suitable transmission path 105. As is also well-known in the art, the encoding techniques, such as DCT encoding, typically include applying appropriate compression techniques to the signal so as to reduce the amount of data used to represent the information in an image.

At the receiver apparatus 104, the processing circuitry 107 processes the received compressed video bit stream. The receiver processing circuitry 107 converts the compressed video bit stream back to an analog or digital video image signal 111 which is delivered to a unit 112 such as a monitor, signal processing unit, or storage unit which displays, processes, or stores the picture represented by the signal.

Sometimes, the unit 112 at the receiver location has a lower resolution than the resolution of the image to which the received bit stream corresponds. For example, the compressed video bit stream may correspond to a CIF resolution whereas the unit 112 might use, for example, a QCIF resolution. This difference in resolution necessitates that a downscaling procedure be performed at the receiver apparatus to permit the display unit to properly display the image.

Alternatively, the display unit 112 at the receiver location may have an equal or higher resolution than the received bit stream image resolution. In this case, the video signal is not displayed on the entire display unit 112, but only a portion of it.

In the present invention, the downscaling operation is performed at the bit stream level, before the decoding step, and this significantly decreases decoding complexity and reduces memory requirements.

Figure 3:
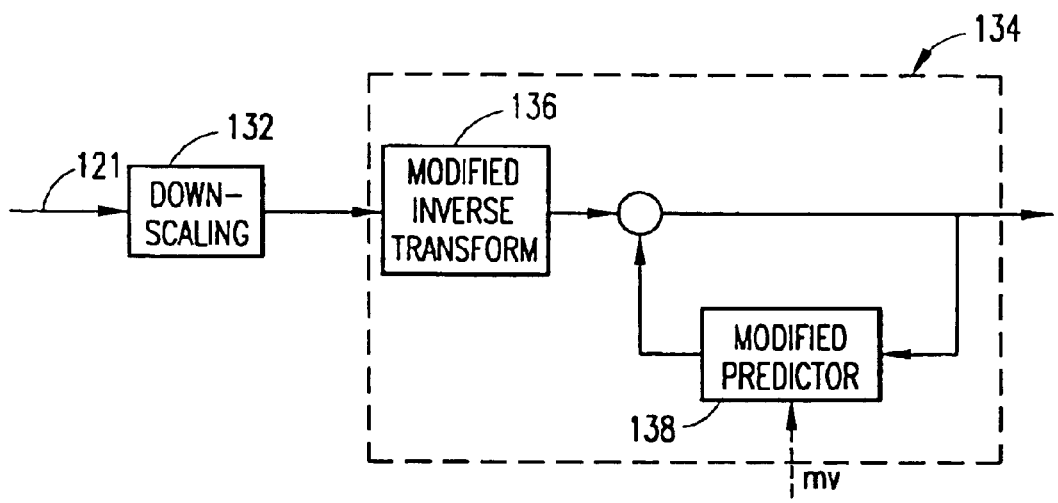
FIG. 3 schematically illustrates a decoding procedure for downscaling a video image signal according to a presently preferred embodiment of the invention.

The decoding procedure according to the present invention is schematically illustrated in FIG. 3. As shown in FIG. 3, the compressed bit stream on line 121 received by the processing circuitry 107 of the receiver apparatus 104 is first downscaled and is then decoded. The downscaling is illustrated by block 132 and involves the removal of DCT components. Thereafter, the signal is decoded by a video decoder loop 134. The video decoder loop uses a modified inverse transform 136 and a modified predictor 138, which will be described more fully below.

In a presently preferred embodiment, the unmodified bit stream uses 8*8 DCT blocks. The downscaling block 132 in FIG. 3 involves discarding the high frequency components such that the modified block size is n*n, where k<=n<=8. The modified inverse transform (MIT) is assumed to produce k*k pixel (pel) values, and, as a first approximation, the complexity of the modified decoding loop becomes $K^2/64$. Table 1 below illustrates the resulting picture resolution and corresponding complexity for different values of k if the unmodified bit stream uses CIF (352*288).

TABLE 1

| K | resolution | complexity |
|---|---|---|
| 1 | 44 * 36 | 0.015 |
| 2 | 88 * 72 | 0.06 |
| 3 | 132 * 108 | 0.14 |
| 4 | 176 * 144 | 0.25 |
| 5 | 220 * 180 | 0.39 |
| 6 | 264 * 216 | 0.56 |
| 7 | 308 * 252 | 0.77 |
| 8 | 352 * 288 | 1 |

The modified inverse transform is designed without any significant picture quality loss for still picture decoding, and is readily apparent to those skilled in the art. The initial bitstream is organized into a number of DCT block with coefficients representing 8*8 pixel blocks. The modified IDCT is then used to produce k*k pixels in each block by using n*n coefficients, where k<=n<=8. Examples of such matrices using n=k as an example are listed in Table 2 below where the basis functions are seen as columns. The floating point numbers can be easily approximated by integer numbers to give limited resolution arithmetic.

TABLE 2

| k | Modified Inverse Transform Matrix | | | | | | |
|---|---|---|---|---|---|---|---|
| 1 | 0.35 | | | | | | |
| 2 | 0.35 | 0.32 | | | | | |
|   | 0.35 | −0.32 | | | | | |
| 3 | 0.35 | 0.41 | 0.20 | | | | |
|   | 0.35 | 0.00 | −0.39 | | | | |
|   | 0.35 | −0.41 | 0.20 | | | | |
| 4 | 0.35 | 0.45 | 0.33 | 0.16 | | | |
|   | 0.35 | 0.19 | −0.33 | −0.38 | | | |
|   | 0.35 | −0.19 | −0.33 | 0.38 | | | |
|   | 0.35 | −0.45 | 0.33 | −0.16 | | | |
| 5 | 0.35 | 0.46 | 0.36 | 0.22 | 0.09 | | |
|   | 0.35 | 0.27 | −0.16 | −0.34 | −0.18 | | |
|   | 0.35 | 0.00 | −0.39 | 0.00 | 0.18 | | |
|   | 0.35 | −0.27 | −0.16 | 0.34 | −0.18 | | |
|   | 0.35 | −0.46 | 0.36 | −0.22 | 0.09 | | |
| 6 | 0.35 | 0.47 | 0.39 | 0.29 | 0.18 | 0.09 | |
|   | 0.35 | 0.35 | −0.00 | −0.29 | −0.35 | −0.20 | |
|   | 0.35 | 0.14 | −0.39 | −0.33 | 0.18 | 0.34 | |
|   | 0.35 | −0.14 | −0.39 | 0.33 | 0.18 | −0.34 | |
|   | 0.35 | −0.35 | 0.00 | 0.29 | −0.35 | 0.20 | |
|   | 0.35 | −0.47 | 0.39 | −0.29 | 0.18 | −0.09 | |
| 7 | 0.35 | 0.48 | 0.43 | 0.35 | 0.27 | 0.18 | 0.11 |
|   | 0.35 | 0.38 | 0.10 | −0.20 | −0.35 | −0.34 | −0.23 |
|   | 0.35 | 0.21 | −0.29 | −0.41 | −0.09 | 0.22 | 0.22 |
|   | 0.35 | 0.00 | −0.46 | 0.00 | 0.35 | 0.00 | −0.19 |
|   | 0.35 | −0.21 | −0.29 | 0.41 | −0.09 | −0.22 | 0.22 |
|   | 0.35 | −0.38 | 0.10 | 0.20 | −0.35 | 0.34 | −0.23 |
|   | 0.35 | −0.48 | 0.43 | −0.35 | 0.27 | −0.18 | 0.11 |

The modified predictor MP needs to take several aspects into account:

1. Scaling of the Motion Vector. Originally the motion vector has a resolution of ½ pels. The modified motion will have a resolution of $$\frac{k}{8} * \frac{1}{2} \text{ or } \frac{k}{16}$$

2. If the non-modified motion vector specifies using full pixels (full-pel), no blurring occurs in the prediction process. Therefore, the scaled motion compensation, which might be sub-pel, shall have as little lowpass filtering as possible. This would theoretically be implemented with linear-phase all-pass filters which do not exist; and is, in practice, implemented by so-called spline-interpolating filters. Experiments have shown that 4-tap filters are sufficient (see Table 3a).

3. If the non modified motion vector is specified in half pixels (half-pel), blurring will occur in the prediction process. Accordingly, blurring will also occur in the scaled prediction. For k=7, tests show that bilinear blur is okay (see Table 3c) and that for k=6, more care is needed. If both horizontal and vertical motion vector is half-pel, bilinear blur is used. For all other cases, 4-tap filters with limited blur is best (see Table 3b). These limited blur filters are essentially a compromise between allpass and bilinear filters.

TABLE 3

| Scaled mv | a. spline-like | | | | b. compromise | | | | c. bi-linear | | |
|---|---|---|---|---|---|---|---|---|---|---|---|
| 0 | 0 | 256 | 0 | 0 | 0 | 256 | 0 | 0 | 0 | 256 | 0 | 0 |
| 1/16 | -7 | 251 | 14 | -2 | -3 | 244 | 16 | -1 | 0 | 240 | 16 | 0 |
| 1/16 | -12 | 243 | 30 | -5 | -6 | 232 | 32 | -2 | 0 | 224 | 32 | 0 |
| 3/16 | -16 | 232 | 48 | -8 | -8 | 220 | 48 | -4 | 0 | 208 | 48 | 0 |
| 4/16 | -18 | 218 | 66 | -10 | -9 | 204 | 66 | -5 | 0 | 192 | 64 | 0 |
| 5/16 | -20 | 203 | 86 | -13 | -10 | 186 | 86 | -6 | 0 | 176 | 80 | 0 |
| 6/16 | -21 | 186 | 107 | -16 | -10 | 170 | 104 | -8 | 0 | 160 | 96 | 0 |
| 7/16 | -20 | 167 | 127 | -18 | -10 | 154 | 121 | -9 | 0 | 144 | 112 | 0 |
| 8/16 | -19 | 147 | 147 | -19 | -9 | 137 | 137 | -9 | 0 | 128 | 128 | 0 |

C-Code for Filter Selection

```
Hor-filter=ver_filter=a;      // assume full-pel in non-
                              modified case
If (k==7)
    [if (mv_hor is half-pel) hor_filter = c;
     if (mv_ver is half-pel) ver_filter = c;]
else if (k==6)
    [if (mv_hor && mv_ver are both half-pel)
    hor_filter=ver_filter=c;
        else if (mv_hor is half-pel)    hor_filter=b;
        else if (mv_ver is half-pel)    ver_filter=b;]
else if (k>2)
    [if (mv_hor is half-pel) hor_filter=b;
     if (mv_ver is half-pel) ver_filter=b;]
```

4. The non-modified prediction process uses rounding in the half-pel interpolation. Rounding can be either upwards or downwards depending on pixel values. In the scaled case, the rounding must correspond to avoid drift. The following method guarantees the same probability for up-rounding with respect to down-rounding to minimize long term drift. In the below description, r normally has the value zero (0). However, in some cases it can have the value one (1). For example, in MPEG-4 and H.263 it is possible to transmit the value of r as side information.

Non-Modified Rounding
If (mv_hor && mv_ver are both half-pel)
    p=(a+b+c+d+2-r)//4;
Else if (mv_hor||mv_ver is half_pel)
    p=(a+b+1-r)//2;

Modified Rounding
If (mv_hor && mv_ver are both half-pel) R=256*(10-4r);
Else if (mv_hor||mv_ver is half_pel) R=256*(12-8r);
Else R=256*8;
The usage of R depends on the scaled mv . . .
If (mv_hor_scaled && mv_ver_scaled are both sub-pel)
    {predicted_pel=(filter_cof(0)*pre_pel(0)+ . . . +filter_
        cof(15)*pre_pel(15)+(R<<4))>>16;}
Else if (mv_hor_scaled||mv_ver_scaled one is sub_pel)
    {predicted_pel=(filter_cof(0)*pre_pel(0)+ . . . +filter_
        cof(3)*pre_pel(3)+(R>>4))>>8;}
Else
    predicted_pel=pre_pel(0);

As can be seen, R is scaled to match the number to be derived. For example, only one sub_pel scaled motion vector and one half_pel non-scaled motion vector R=256*(12-8r)=256*12 or 256*4. When this number is scaled with >>4, it can assume values of 192 or 64 (x+64)>>8 then have probabilities to be rounded upwards, downwards or not rounded at all. These probabilities shall match corresponding probabilities in the non-scaled case as well as possible, which means that the long-term amount of up and down rounding shall be the same.

Figure 4:
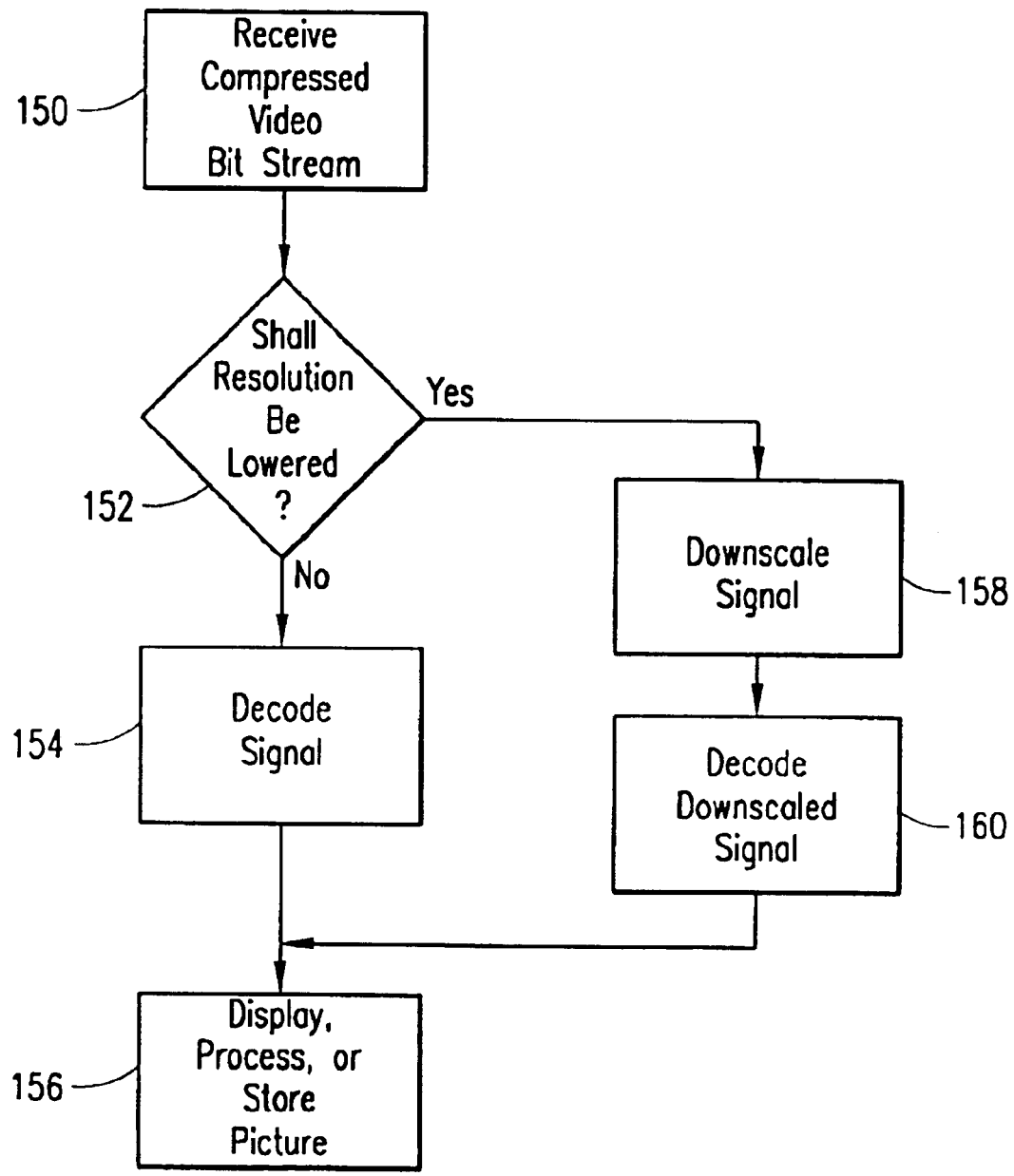
FIG. 4 is a flow chart illustrating the video decoding method according to a presently preferred embodiment of the invention.

FIG. 4 is a flow chart illustrating the decoding method according to a preferred embodiment of the present invention.

First, the compressed video bit stream from, for example, transmitter apparatus 102 is received by the receiver apparatus 104 for processing by the processing circuitry 107 thereof as shown by block 150. If the bit stream corresponds to a video signal having a resolution which is the same as the resolution of the display unit 112 at the receiver location (NO output of decision block 152), the signal is decoded 154 and ultimately used to display a picture on the display unit as illustrated by block 156.

If the bit stream corresponds to a resolution which is higher than the resolution of the display unit 102 (YES output of decision block 152, the signal is first downscaled (block 158) and then decoded (block 160) before being used to display the lower resolution picture on the display unit as shown in block 156.

While what has been described herein constitutes presently most preferred embodiments of the invention, it should be recognized that the invention could take numerous other forms. Accordingly, it should be understood that the invention is to be limited only insofar as is required by the scope of the following claims.

What is claimed is:

1. A method of processing a compressed video bit stream corresponding to a compressed video signal having a first resolution to provide a video signal having a second resolution lower than the first resolution for use by a display unit having the second resolution, said method comprising:

downscaling the compressed video bit stream, said downscaling step including removing transform components;

decoding the downscaled compressed video bit stream using modified prediction to provide the video signal having the second resolution, said decoding step including the steps of:
  scaling a motion vector;
  if said motion vector is full-pel, using spline-interpolating filters for scaling motion compensation;
  if said motion vector is half-pel and k=7, using bilinear blur for scaling motion compensation;
  if said motion vector is half-pel in the horizontal and vertical direction and k=6, using bilinear blur for scaling motion compensation; and
  if said motion vector is half-pel and k<6, using 4-tap filters with limited blur for scaling motion compensation, wherein said modified block Size is k*k, where k<8; and using the video signal having the second resolution to display an image on the display unit at the second resolution.

2. An apparatus for decoding a compressed video bit system corresponding to a compressed video signal having a first resolution to a video signal having a second resolution lower then the first resolution, said apparatus comprising signal processing circuitry that downscales the compressed video bit stream to remove transform components, and, thereafter, decodes the downscaled compressed video bit stream to provide the video signal having the second resolution, wherein said signal processing circuitry further comprises:
  means for modifying the block size of the bitstream from a given size to a modified block size smaller than said given size;
  means for discarding high frequency components;
  means for multiplying the modified block of the bitstream with a modified inverse transform matrix; and
  means for using a modified prediction process so as to reduce mismatch degradation.

3. A method for decoding a compressed video bit stream corresponding to a compressed video signal having a first resolution to a video signal having a second resolution equal to or higher than the first resolution, said method comprising:

decoding the compressed video bit stream using modified prediction, said decoding step including the steps of:
  scaling a motion vector;
  if said motion vector is full-pel, using spline-interpolating filters for scaling motion compensation;
  if said motion vector is half-pel and k=7, using bilinear blur for scaling motion compensation;
  if said motion vector is half-pel in the horizontal and vertical direction and k=6, using bilinear blur for scaling motion compensation; and
  if said motion vector is half-per and kc<6, using 4-tap filters with limited blur for scaling motion compensation; and using said video signal to display an image on a portion of a display unit having said second resolution.

4. The method according to claim 3, wherein said bit stream uses blocks of a given size, and wherein said decoding step is provided a bit stream having a modified block size smaller than said given size.

5. The method according to claim 4, wherein said given block size is 8*8 DCT and wherein said modified block size is k*k, where k<8.

6. The method of claim 3 wherein MPEG video format provides at least one of the first resolution and the second resolution.

7. The method of claim 3 wherein PGA video format provides at least one of the first resolution and the second resolution.

8. An apparatus for decoding a compressed video bit stream corresponding to a compressed video signal having a first resolution to a video signal having a second resolution equal to or higher than the first resolution, said apparatus comprising signal processing circuitry that decodes the compressed video bit stream to provide the video signal to a display unit, said signal processing circuitry comprising:
  means for modifying the block size of the bitstream;
  means for discarding high frequency components;
  means for multiplying the modified block of the bitstream with a modified inverse transform matrix; and
  means for using a modified prediction process so as to reduce mismatch degradation.

* * * * *

UNITED STATES PATENT AND TRADEMARK OFFICE
CERTIFICATE OF CORRECTION

PATENT NO. : 6,898,245 B2
APPLICATION NO. : 09/818043
DATED : May 24, 2005
INVENTOR(S) : Brusewitz Page 1 of 1

It is certified that error appears in the above-identified patent and that said Letters Patent is hereby corrected as shown below:

In Column 7, Line 25, in Claim 2, delete "system" and insert -- stream --, therefor.

In Column 8, Line 13, in Claim 3, delete "half-per" and insert -- half-pel --, therefor.

In Column 8, Line 13, in Claim 3, delete "kc<6" and insert -- k<6 --, therefor.

Signed and Sealed this

Thirtieth Day of October, 2007

JON W. DUDAS
*Director of the United States Patent and Trademark Office*